United States Patent
Bodie et al.

(10) Patent No.: US 6,505,108 B2
(45) Date of Patent: Jan. 7, 2003

(54) DAMPER BASED VEHICLE YAW CONTROL

(75) Inventors: Mark Olen Bodie; Aleksander Boguslaw Hac, both of Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/963,765

(22) Filed: Sep. 26, 2001

(65) Prior Publication Data

US 2002/0128760 A1 Sep. 12, 2002

Related U.S. Application Data (63) Continuation-in-part of application No. 09/516,567, filed on Mar. 1, 2000.

(51) Int. Cl.[7] .......................... B60G 17/00; G01M 15/00
(52) U.S. Cl. .............................. 701/41; 701/37; 701/72; 280/703; 280/707; 280/711; 180/41
(58) Field of Search .............................. 701/41, 38, 91, 701/37, 72; 280/772, 703, 707, 840, 711; 180/41

(56) References Cited

U.S. PATENT DOCUMENTS

| | | | | |
|---|---|---|---|---|
| 3,857,535 A | * | 12/1974 | Osder ....................... | 244/77 M |
| 4,652,010 A | | 3/1987 | Sugasawa ................... | 280/707 |
| 4,730,843 A | | 3/1988 | Tanaka et al. ............... | 280/689 |
| 4,761,022 A | | 8/1988 | Ohashi et al. ............... | 280/772 |
| 4,827,416 A | | 5/1989 | Kawagoe et al. ............. | 701/41 |
| 4,973,855 A | | 11/1990 | Kamimura et al. .......... | 280/707 |
| 5,062,657 A | | 11/1991 | Majeed ........................ | 280/707 |
| 5,268,841 A | * | 12/1993 | Mouri ......................... | 180/141 |
| 5,510,988 A | | 4/1996 | Majeed et al. .......... | 364/424.05 |
| 5,570,288 A | | 10/1996 | Badenoch et al. ..... | 364/424.05 |
| 5,623,409 A | * | 4/1997 | Miller ......................... | 180/443 |
| 5,627,751 A | | 5/1997 | Davis et al. .................. | 701/29 |
| 5,747,683 A | * | 5/1998 | Gerum et al. ................ | 701/72 |
| 5,852,787 A | | 12/1998 | Fodor et al. ................... | 701/6 |
| 5,931,887 A | | 8/1999 | Hac ............................. | 701/71 |
| 6,035,251 A | | 3/2000 | Hac et al. ..................... | 701/70 |
| 6,053,583 A | | 4/2000 | Izumi et al. ................. | 303/150 |
| 6,097,999 A | | 8/2000 | Shal et al. .................... | 701/38 |
| 6,161,905 A | | 12/2000 | Hac et al. .................... | 303/146 |
| 6,181,997 B1 | | 1/2001 | Badenoch et al. ............ | 701/37 |
| 6,205,375 B1 | | 3/2001 | Naito ............................ | 701/1 |
| 6,219,602 B1 | * | 4/2001 | Badenoch et al. ............ | 701/37 |
| 6,370,458 B1 | * | 4/2002 | Shai et al. .................... | 701/37 |

OTHER PUBLICATIONS

"Nonlinear Control of Vehicle Yaw Rate Via Roll Moment Distribution" Proceedings of the American Control Conference Jefferson, Maryland; Jun., 1994.

"Closed Loop Yaw Control of Vehicles Using Magneto–Rheological Dampers"; Mard O. Bodie and Aleksander Hac; Society of automotive Engineers, Inc.; 1999.

"Active Control Strategy for Improved Handling and Stability"; Masaki Yamamoto; SAE Technical Paper Series No. 911902; Sep. 1991.

\* cited by examiner

Primary Examiner—William A. Cuchlinski, Jr.
Assistant Examiner—Tuan C To
(74) Attorney, Agent, or Firm—Robert M. Sigler (57) ABSTRACT

Controllable dampers are used to improve vehicle responses and stability during severe vehicle handling maneuvers. A total handling damping value for the vehicle is derived, preferably from the greatest of a yaw rate error value, a lateral acceleration value and a time derivative of lateral acceleration value. In addition, a control ratio of front axle roll damping to total roll damping is derived, preferably from the yaw rate error value, an oversteer/understeer indication and possibly vehicle speed. From these values, handling damping values are derived for each wheel of the vehicle and blended with damping values for the same wheels derived from suspension component movement to determine a corner damping command for each controllable damper. Preferably, the damping values derived from suspension component movement are shifted away from damping control of the vehicle body toward handling damping control when yaw rate error is large in magnitude.

18 Claims, 8 Drawing Sheets

DAMPER BASED VEHICLE YAW CONTROL

RELATED APPLICATION

This is a Continuation-in-Part of U.S. Ser. No. 09/516,567, filed Mar. 1, 2000 and assigned to the assignee of this application.

TECHNICAL FIELD

The present invention relates to vehicle suspensions and the control thereof. More particularly, the present invention relates to a method of controlling a vehicle suspension by utilizing controllable dampers to distribute damping forces between front and rear axles.

BACKGROUND OF THE INVENTION

Several types of active control systems for vehicles have been employed to improve vehicle stability and handling by influencing tire forces in the horizontal (yaw) plane. Examples of such systems are active rear steer, active brake control of individual wheels, active suspensions, and active roll bars.

Vehicle handling response to driver steering inputs is to a large extent determined by the forces between the tires and the road surface. During normal driving, tires remain within linear ranges of operation, where tire lateral forces increase proportionally to tire slip angles. Consequently, at a given speed, vehicle yaw rate is proportional to the steering angle. This linear and consistent response of the vehicle to driver steering inputs may change when tires approach or reach the limit of adhesion, as may happen during emergency handling maneuvers or during driving on slippery roads. In these conditions, vehicle handling characteristics can change quite rapidly from those to which the driver is accustomed and affect the driver's ability to control the vehicle.

It is generally agreed that in order to improve the probability of a typical driver maintaining control of a vehicle in emergency situations, vehicle handling behavior should remain close to that experienced in the linear range of tire operation. Several types of active control systems have been developed to improve vehicle handling. These systems generally influence the tire forces in the yaw plane, thus producing a corrective yaw moment that forces vehicle response to remain close to the desired response. Tire longitudinal and lateral forces are nonlinear functions of surface coefficient of adhesion, tire longitudinal slip, tire slip angle and normal load. With the exception of the surface coefficient of adhesion, each of these variables can be controlled by an electronically controlled chassis subsystem, thus directly or indirectly affecting tire longitudinal and lateral forces.

Tire lateral forces are nonlinear functions of normal load. More specifically, they exhibit a soft characteristic; that is, they initially increase almost proportionally with normal load, then curve gently, and subsequently either saturate or reach a maximum and start decreasing as the load increases. The maximum lateral force typically occurs at the normal load between 1.4 to 2.5 times the nominal load, depending on the type of tire and the tire slip angle. It is noteworthy that for small slip angles, where tire force characteristics remain a linear function of slip angle, the lateral force is a nonlinear function of the normal load; in fact, in this range the nonlinearity with respect to the normal load is more pronounced than at the limit of adhesion.

During cornering maneuvers tire lateral forces along with the vehicle inertial force form a roll moment, which is balanced by the tire normal forces. As a result, vertical loads on the outside tires are larger than on the inside tires. This is referred to as normal load transfer. During transient maneuvers, the proportion between the roll resisting moments developed by front and rear suspensions depends on the distribution of both roll stiffness and roll damping between front and rear suspensions. As a result, total normal load transfer can be split between the front and rear tires in various proportions. Because of the relationship between the normal and lateral tire forces described above, the lateral force per axle decreases as the normal load transfer increases. This mechanism can be used to affect the balance of lateral forces between front and rear axles, thus affecting the yaw response of the vehicle.

Figure 10:
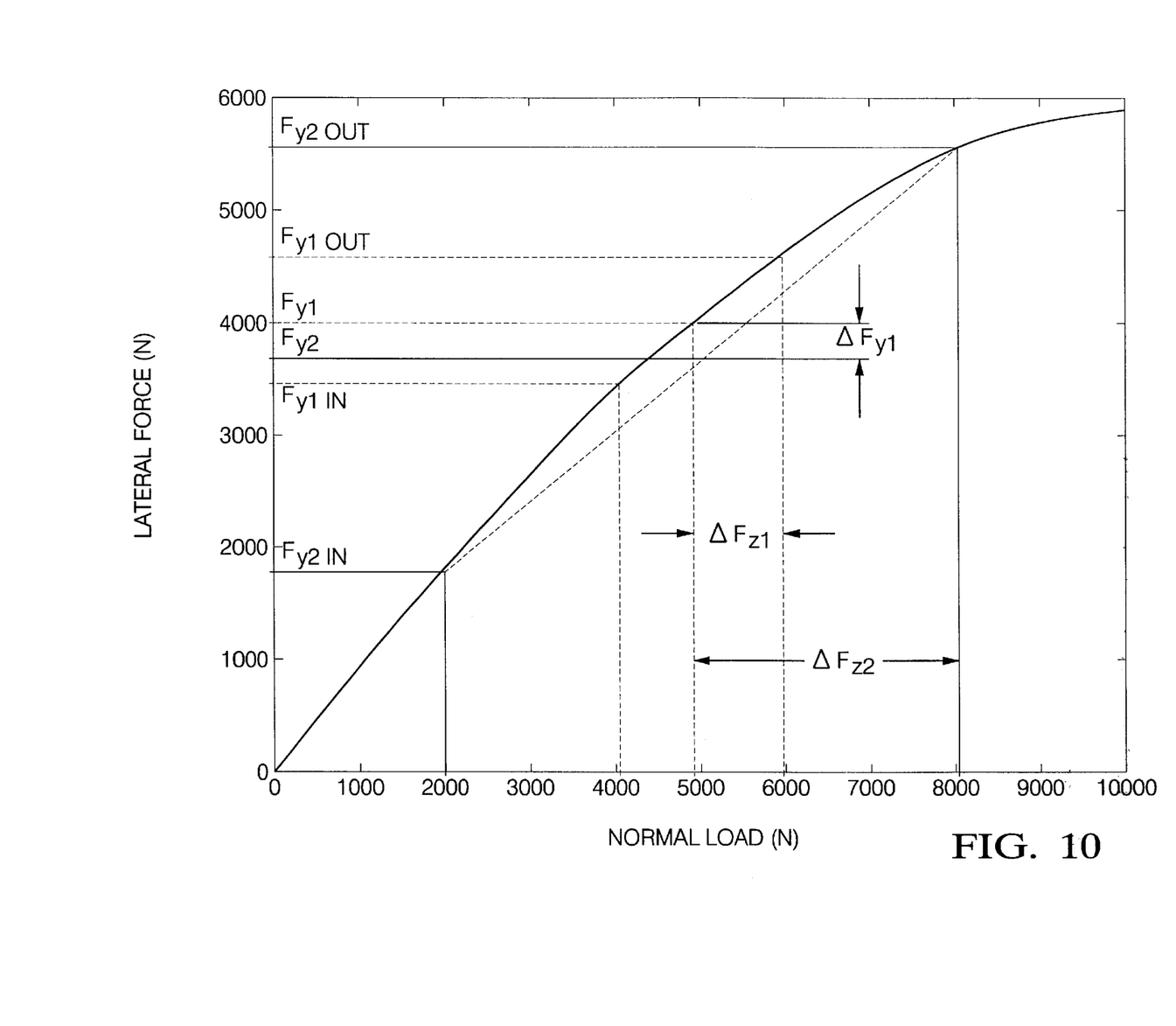
FIG. 10 is a diagram of the lateral force versus the normal load.

Referring to FIG. 10, during a cornering maneuver, if the normal load transfer of the front axle is $\Delta F_{z1}$, then the lateral forces generated by the inside and outside tires are $F_{y1in}$ and $F_{y1out}$, respectively. This yields an average lateral force per tire of $F_{y1}$, which is only slightly below the lateral force corresponding to the nominal normal load. Suppose now that the normal load transfer is increased to the value of $\Delta F_{z2}$, which results in the lateral forces of $F_{y2in}$ and $F_{y2out}$. The average lateral force per tire is now $F_{y2}$, which is significantly less than $F_{y1}$. By increasing the normal load transfer, the lateral force per axle was reduced by $$\Delta F_{yf}=2*(F_{y1}-F_{y2}).$$

The same mechanism acts on the rear axle, where the normal load transfer is reduced, to increase the lateral force by $\Delta F_{yr}$. As a result, a corrective yaw moment $$\Delta M_z=\Delta F_{yf}*a-\Delta F_{yr}*b$$

is exerted on the vehicle. In the above equation a and b denote the distances of vehicle center of gravity to the front and rear axles, respectively, and the steering angle is assumed to be small. Thus, by changing the normal load distribution among the four vehicle corners, the yaw response can be affected. The effect described above can be achieved, for example, by increasing the damping of the front suspension and reducing the damping of the rear. This represents an oversteer correction, since the yaw moment imparted on the vehicle reduces the rate of rotation. The opposite damper settings will reduce vehicle tendency to understeer.

The mechanism described above is routinely applied to alter vehicle handling characteristics through passive roll stiffness distribution (anti-roll bars) and has been utilized in actively controlled suspension systems equipped with active roll bars. The prior art, however, does not disclose controllable dampers utilized to affect vehicle yaw response.

Accordingly, it is an object of this invention to provide a new active suspension control system that enhances vehicle stability and handling in fast evasive maneuvers performed close to the limit of adhesion.

It is a further object to provide an improved yaw response of a vehicle through the correction of both oversteer and understeer, especially in transient maneuvers performed on road surfaces that have a high coefficient of adhesion.

It is another object of this invention to provide a system that reduces the effort required by a driver to steer the vehicle while performing emergency handling maneuvers.

It is yet another object of this invention to provide a system that reduces the roll velocity and roll angle of a vehicle during emergency maneuvers.

It is another object of this invention to provide a system that maintains a more consistent vehicle response by reducing variations due to changes in payload, tires or such occurrences as rough roads or an inconsistent surface coefficient of adhesion.

It is another object of this invention to provide a system that has the ability to adjust oversteer and understeer characteristics as a function of speed.

Finally, it is an object of this invention to provide a system that is able to perform the above stated objects and functions in an unobtrusive manner.

SUMMARY OF THE INVENTION

The invention is a method for using controllable dampers to improve vehicle responses and stability during severe handling maneuvers. The method derives a total handling damping value for the vehicle and a control ratio of one of the front axle or rear axle roll damping to total roll damping for the vehicle in response to vehicle dynamic variables and further derives therefrom handling damping values for one or more controllable dampers, preferably at least the dampers associated with one of the front axle and the rear axle, and controls the dampers in response to their derived handling damping values. For each controllable damper so controlled, the method preferably blends the handling damping value with a damping value derived from suspension component movement to determine a corner damping command for the controllable damper.

DESCRIPTION OF THE PREFERRED EMBODIMENT

Figure 1:
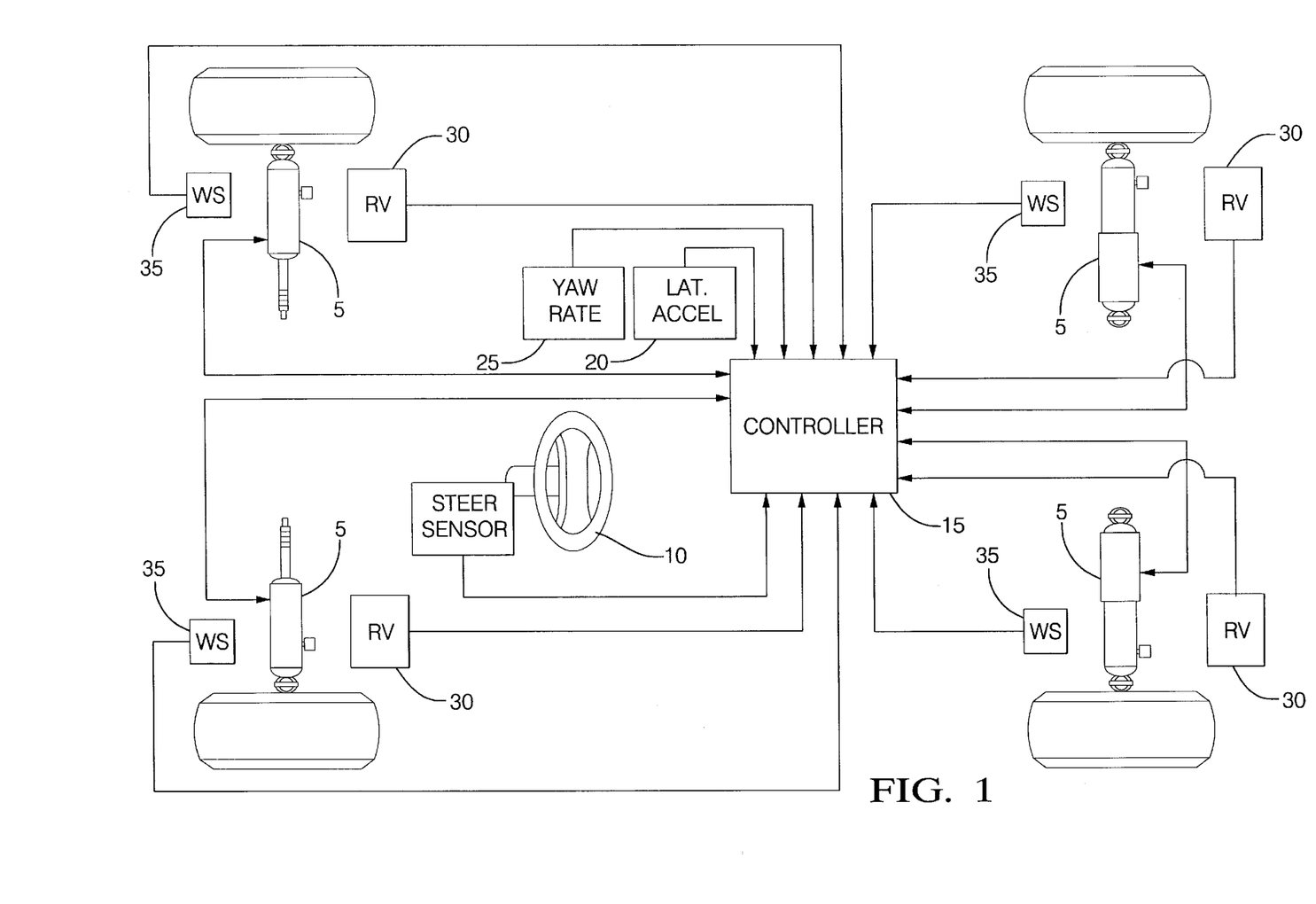
FIG. 1 is a diagram of the hardware required for the damper based yaw control of the present invention.

FIG. 1 details hardware used in a preferred embodiment of the damper based yaw control system of the present invention. There are shown at 5 the controllable dampers of the present invention. The controllable dampers are preferably controlled by an electric current applied to a coil controlling an orifice valve or a magnetorheological fluid so as to vary the damping force characteristic of the damper. Since such coils are preferably provided current switched in Pulse Width Modulation (PWM), this description uses the term PWM to indicate the percentage of full current provided and thus a commanded damping force characteristic, commonly referred to as a commanded "damping." There is also shown a steering sensor 10 for relaying steering information to the controller 15. There are also shown other sensors including a lateral acceleration sensor 20, yaw rate sensor 25, relative velocity sensor 30, and wheel speed sensor 35, that relay information to the controller 15.

As can be seen from the directional arrows of FIG. 1, the various sensors send signals to the controller 15, which processes the information and generates output signals that control the dampers 5. It is possible that the signals obtained from the lateral acceleration sensor 20 and yaw rate sensor 25 can be replaced by estimates, rather than using measured values obtained by the sensors.

Figure 2:
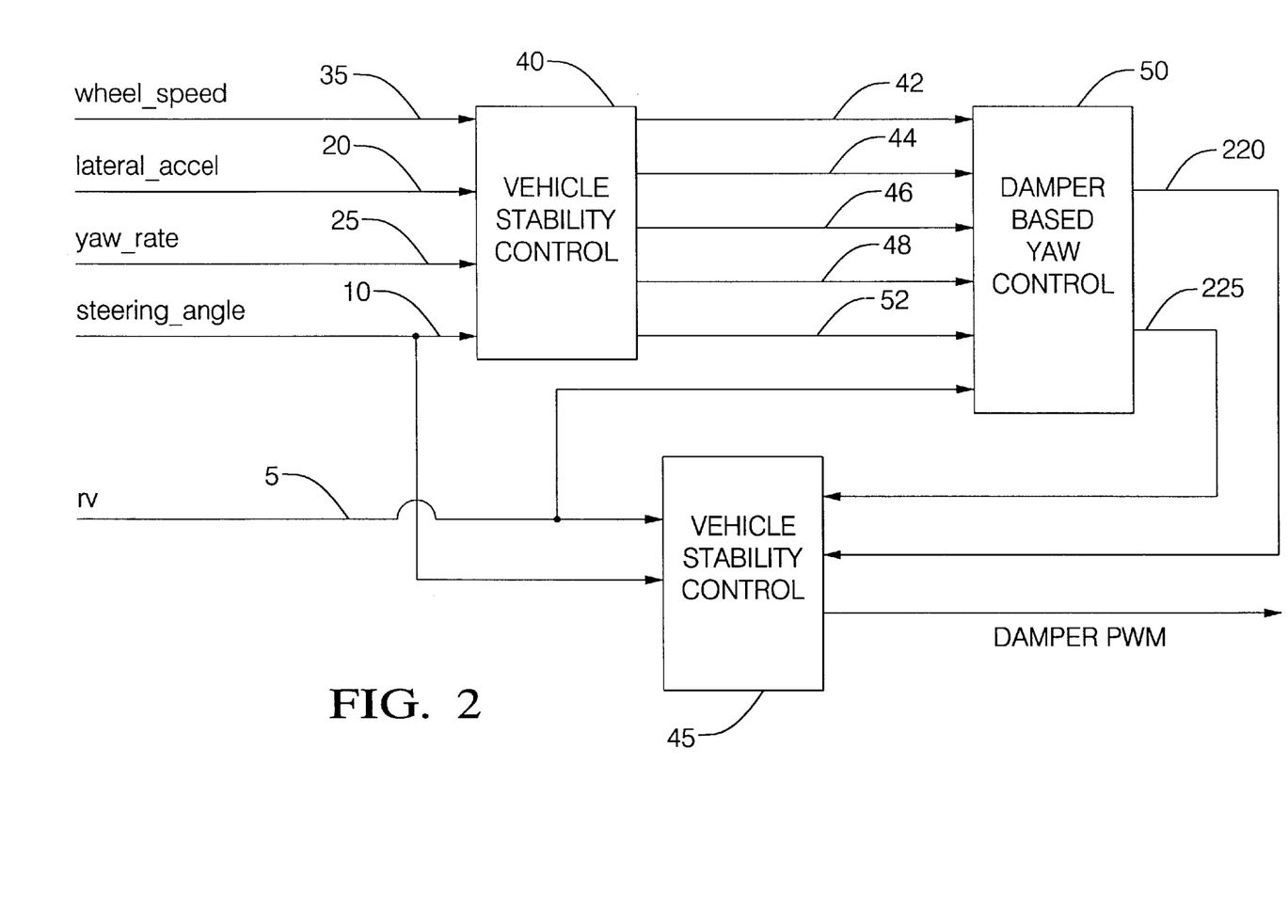
FIG. 2 is a block diagram of the system algorithm.

FIG. 2 details the system algorithm utilized by the present invention. The control algorithm includes a vehicle stability control block 40, continuously variable real time damping (CVRTD) ride controller 45, and a damper based yaw control 50.

The vehicle stability algorithm denoted by the vehicle stability control block 40, uses the measured steering angle, vehicle yaw rate, lateral acceleration and estimated vehicle speed, based on the wheel speeds, and optionally the slip angle and/or slip rate, to generate the corrective yaw command and to determine the over or under steer condition of the vehicle.

The damper based yaw control block 50 uses the corrective yaw command and the over/under steer flag to determine desired handling PWM values for each damper and a handling scale factor as dictated by handling requirements.

The ride control block 45 derives body pulse width modulator (PWM) signal values for the dampers from ride control inputs and the handling scale factor and blends the body PWM values with the handling PWM to obtain a corner PWM for each damper.

Figure 3:
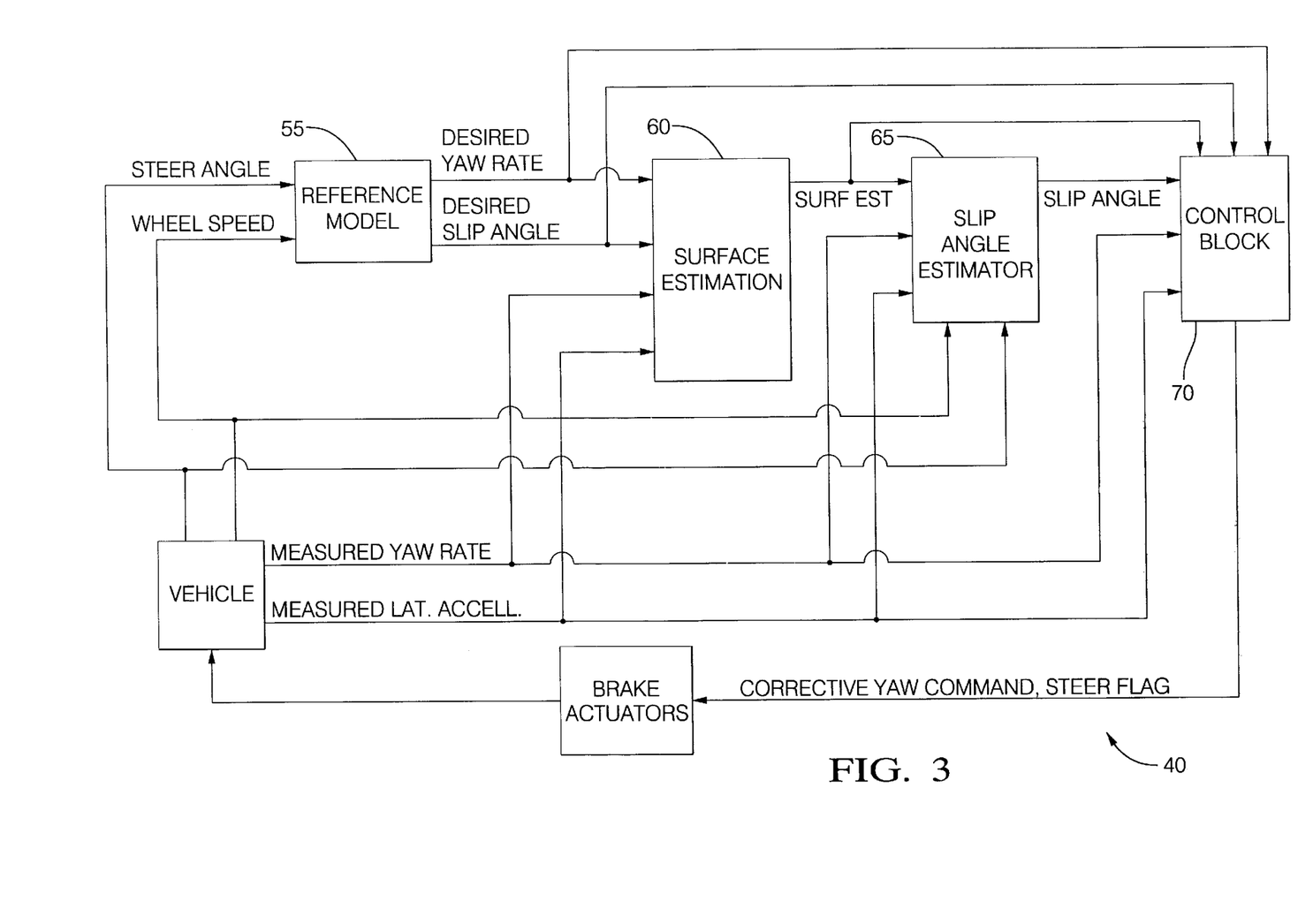
FIG. 3 is a block diagram of the vehicle stability control block.
Figure 4:
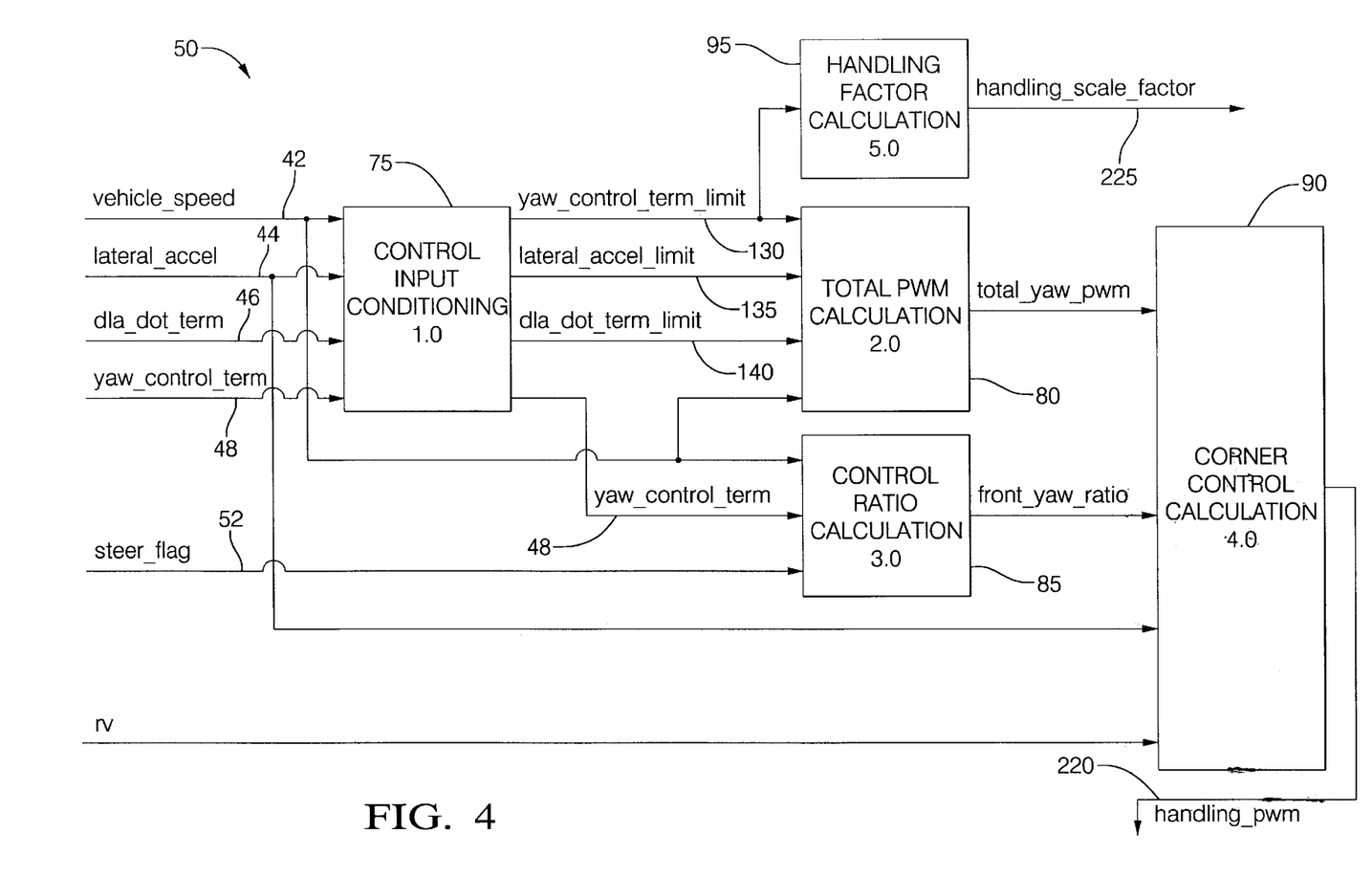
FIG. 4 is a block diagram of the damper based yaw control block.

FIG. 3 details a possible embodiment of the vehicle stability control algorithm 40, similar to that shown in U.S. Pat. No. 6,035,251, issued Mar. 7, 2000 and, at least with respect to the reference model, in U.S. Pat. No. 5,931,887, issued Aug. 3, 1999, the relevant portions of which are incorporated by reference. The stability control algorithm 40 may reside in the brake controller system (not shown). The reference model 55 utilizes the measured steering angle and vehicle speed estimated from wheel speed sensors to generate the desired values of yaw rate and vehicle sideslip angle. One way of calculating these values is by using a linear model of vehicle dynamics in the yaw plane with the parameters of the model depending on vehicle speed.

The surface estimation block 60 detects when the vehicle is at or close to the limit of adhesion and estimates the surface coefficient of adhesion, primarily from measurements of the lateral acceleration when the vehicle is not in a quick transient. During a quick transient performed at the limit of adhesion, the previous value of the surface estimate is maintained.

The estimator of vehicle sideslip angle 65 utilizes a simplified, nonlinear model of the vehicle, in the yaw plane, that is an observer, to estimate the vehicle sideslip angle. The model has a closed loop structure, in that it uses feedback of the measured yaw rate and lateral acceleration to improve the accuracy and overall robustness of the estimation process.

The control block 70 uses the desired and measured (estimated) values of yaw rate and sideslip angle to determine whether the vehicle is in an understeer or oversteer condition, and then calculates the corrective yaw command. The corrective yaw command is related to the desired yaw moment, which should be applied to the vehicle to bring the vehicle's actual response (in terms of yaw rate and slip angle) as close as possible to the desired response. The determination of the corrective yaw command is based on the closed loop control of the vehicle yaw rate and slip angle.

Other embodiments of vehicle stability enhancement control blocks are possible, as long as they determine an over/under steer condition and the corrective yaw command or a composite signal that includes both of them. For example, a simpler version of a vehicle stability control algorithm that uses only closed loop feedback of yaw rate could be utilized by the present invention, such as in the Delphi Production Traxxar™ produced in 1996. Another alternative, could be an algorithm with closed loop feedback of yaw rate and slip rate. This embodiment would eliminate the need for estimation blocks of the surface coefficient of adhesion and slip angle. Another possibility is to use an estimation algorithm that estimates both yaw rate and slip angle using wheel speeds, steering wheel angle and lateral acceleration, as described in U.S. Pat. No. 6,161,905 issued Dec. 19, 2000.

The CVRTD ride control algorithm 45, has been described in U.S. Pat. No. 5,510,988, issued Apr. 23, 1996, U.S. Pat. No. 5,570,288, issued Oct. 29, 1996, and U.S. Pat. No. 6,097,999, issued Aug. 1, 2000, the relevant portions of which are incorporated by reference.

The Damper Based Yaw Control algorithm 50 derives handling damping values (PWM) for application to dampers, preferably Magneto-Rheological (MR) dampers, in severe handling maneuvers so as to distribute the damping forces between the front and rear axles to bring the vehicle yaw rate, slip angle, and/or slip rate as close as possible to the desired yaw rate, slip angle, and/or slip rate. The desired yaw rate, slip angle, and slip rate values are calculated from a vehicle reference model which generates a desired yaw rate, slip angle, and slip rate.

The vehicle stability control algorithm 40 generates the following signals of vehicle dynamic variables that are used by the Damper Based Yaw Control algorithm 50:
1) yaw_control_term 48
2) steer_flag 52
3) dla_dot_term 46
4) lateral_accel 44
5) vehicle_speed 42.

The yaw_control_term 48 is an error term which is derived from the difference between the desired yaw rate, slip angle, and slip rate and the actual yaw rate, slip angle, and slip rate. The steering_flag 52 signal defines the under/oversteer state of the vehicle and is defined as 0 for understeer and 1 for oversteer. The dla_dot_term 46 is the derivative of the desired lateral acceleration. The dla_dot_term 46 is calculated by multiplying the desired yaw rate of the vehicle by the vehicle speed and then differentiating the product. The lateral_accel 44 signal is the measured lateral acceleration and the vehicle_speed 42 signal is the estimated vehicle speed.

FIGS. 4 through 10 detail various portions of the closed loop MR yaw control algorithm 50. In the following sections, the closed loop MR yaw control algorithm 50 will be broken down into the following distinct functional blocks which will be discussed in turn below: Control Input Conditioning 75, Total PWM Calculation 80, Control Ratio Calculation 85, Corner Control Calculation 90, and Handling Factor Calculation 95.

Figure 5:
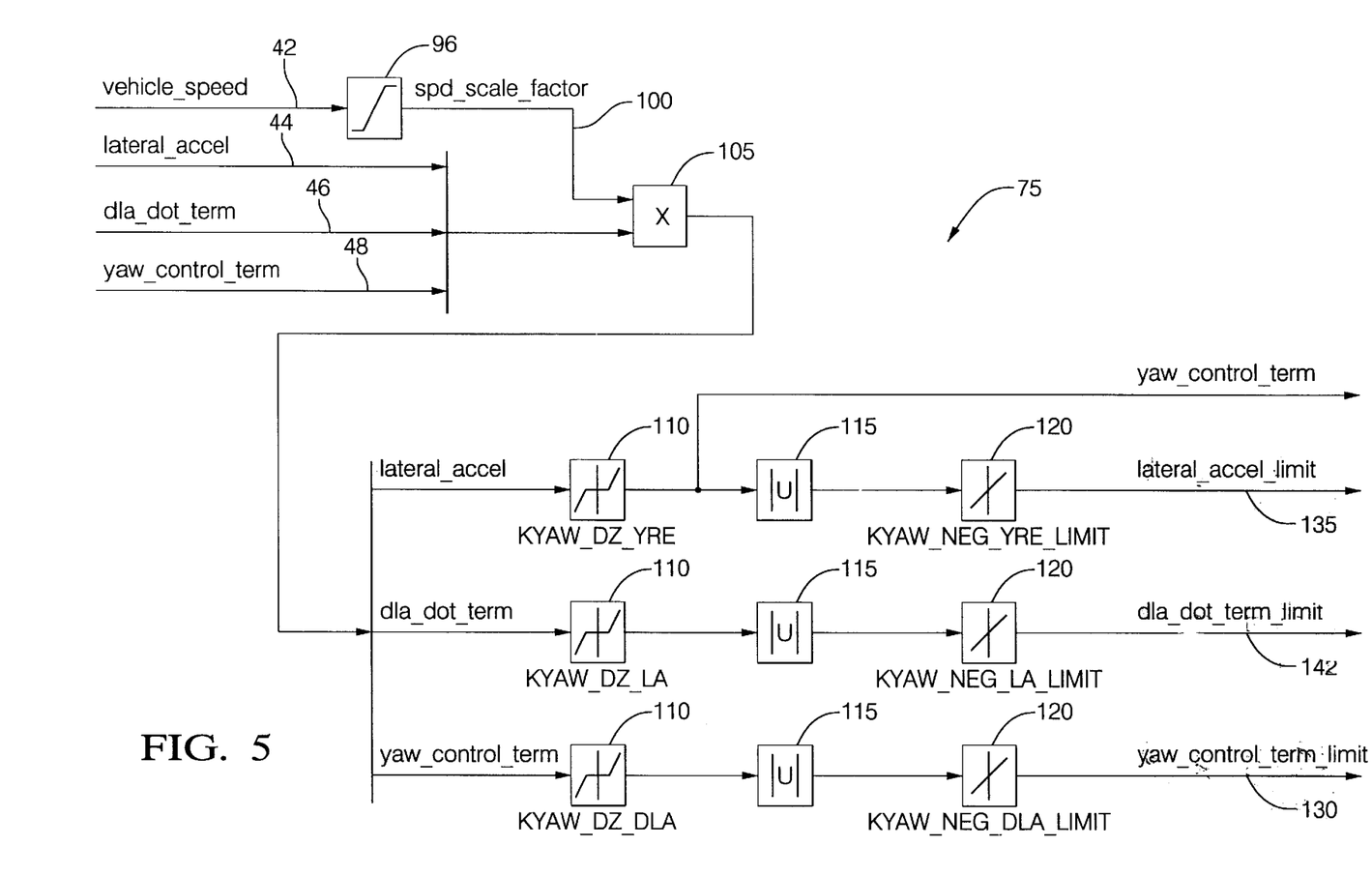
FIG. 5 is a block diagram of the control input-conditioning block.

Referring to FIG. 5 there is detailed the block diagram associated with the Control Input Conditioning. The Control Input Conditioning 75 function is comprised of four sub-functions: low speed exit 105, dead band 110, absolute value 115, and slew rate limiting 120. The low speed exit 105 function acts like a graceful entry/exit condition for the Closed Loop MR Yaw Control algorithm 50. The input signals are multiplied by the spd_scale factor 100 that varies from 0 to 1. The spd_scale_factor 100 is calculated using a 2 point one dimensional lookup table with vehicle speed as the input. At low speeds the spd_scale_factor 100 is zero which is defined by the calibration KYAW_MIN_VEH_SPD[0]. The speed at which the spd_scale_factor 100 is one is defined by the calibration KYAW_MIN_VEH_SPD[1]. Typical values for KYAW_MIN_VEH_SPD 96 are 15 and 20 mph.

The deadband 110 function is used to prevent the Closed Loop Yaw Control algorithm 50 from reacting to noise in the lateral_accel 44, dla_dot_term 46, and yaw_control_term 48 signals. The deadband 110 function operates by setting the output equal to zero if the input is between the deadband calibrations, otherwise the output is the input signal minus the calibration, or:

IF (input<CAL) & (input>−CAL)
    input=0
ELSE IF (input>CAL)
    input=input−CAL
ELSE IF (input<−CAL)
    input=input+CAL
END IF Typical values for KYAW_DZ_YRE 112, KYAW_DZ_LA 114, and KYAW_DZ_DLA 116 are 2.5 deg/sec, 0.2 g, and 0.25 g/sec. Where, g is the acceleration of gravity, 9.81 m/sec$^2$.

The absolute value 115 and slew rate limiting 120 of the yaw_control_term 48, lateral_accel 44, and dla_dot_term 46 are performed to slow the decay of the signal values. The slowing of the above signals allows the control algorithm to be active in cases where sign changes occur for the yaw_control_term 48, lateral_accel 44, and dla_dot_term 46. The slew rate limited 120 function limits the rate of change of a signal, or:

diff=input−old input
IF (diff<CAL_LOWER)
    input=old_input+CAL_LOWER
END IF

Typical values for KYAW_NEG_YRE_LIMIT 122, KYAW_NEG_LA_LIMIT 124, and KYAW_NEG_DLA_LIMIT 126 are −35 deg/sec$^2$, −0.5 g/sec, and −5 g/sec$^2$.

The Control Input Conditioning 75 function basically determines the severity of a handling event and the length of time for the algorithm to be active.

Figure 6:
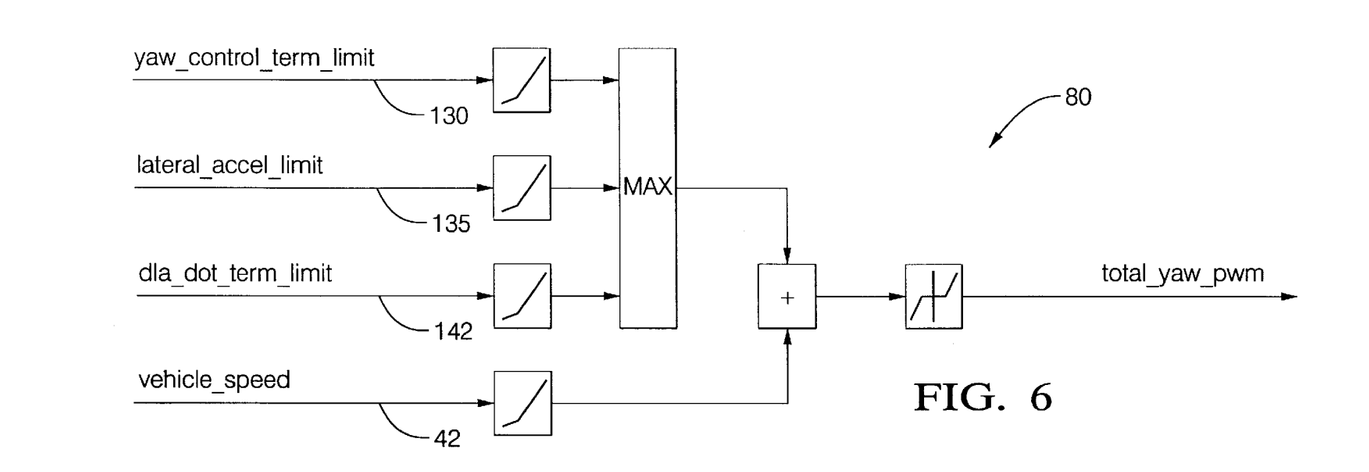
FIG. 6 is a block diagram of the total PWM calculations block.

Referring to FIG. 6, the Total PWM Calculation 80 function determines the control authority associated with an event. The control authority is defined as the amount of damping required of the dampers. The damping is determined in units of PWM with 0 PWM being the smallest amount of damping and 100% PWM being the largest amount of damping for a given damper. The Total PWM Calculation 80 function determines the total handling PWM for the vehicle. The maximum value that the total handling PWM can have is 400% PWM, 100% for each damper.

Referring to FIGS. 5 and 6 for the block diagrams associated with the Control Input Conditioning 75 function, the function calculates three PWMs that are associated with the signals: yaw_rate_control_term_limit 130, lateral_accel_limit 135, and dla_dot_term 140. Each signal is an input to a one-dimension, three point lookup table that outputs PWM. The maximum PWM from the yaw_error_limit 130, lateral_accel_limit 135, and dla_dot_term 140 is selected. The total_yaw_pwm 215 is then saturated. The following pseudo code shows how the total PWM is calculated:

lateral_accel_PWM=table1(KYAW_LAT_TOTAL, KYAW_LAT_PWM, lateral_accel_limit)

yaw_rate_PWM=table1(KYAW_YRE_TOTAL, KYAW_YRE_PWM, yaw_rate_control_term_limit)

dla_dot_term_PWM=table1(KYAW_DLA_TOTAL, KYAW_DLA_PWM, dla_dot_term_limit)

total_yaw_pwm=MAX(lateral_accel_PWM, yaw_rate_PWM, dla_dot_term_PWM)

IF (total_yaw_pwm>KYAW_MAX_PWM) total_yaw_pwm=KYAW_MAX_PWM,

ELSE IF(total_yaw_pwm<KYAW_MIN_PWM) total_yaw_pwm=KYAW_MIN_PWM;

END IF

Typical values are:

KYAW_YRE_TOTAL 145 [0, 10, 15] (deg/sec)
KYAW_YRE_PWM 150 [0, 50, 400] (PWM)
KYAW_LA_TOTAL 155 [0, 0.35, 0.75] (g)
KYAW_LA_PWM 160 [0,50, 400] (PWM)
KYAW_DLA_TOTAL 165 [0,0 0.5, 2.0] (g/sec)
KYAW_DLA_PWM 170 [0, 50, 400] (PWM)

The control authority or damping increases when any of the slew limited magnitudes, yaw control term 48, lateral acceleration 44, or derivative of lateral acceleration 46 becomes large, as is associated with severe maneuvers. The control authority may also increase at high speeds, as denoted in FIG. 6.

Figure 7:
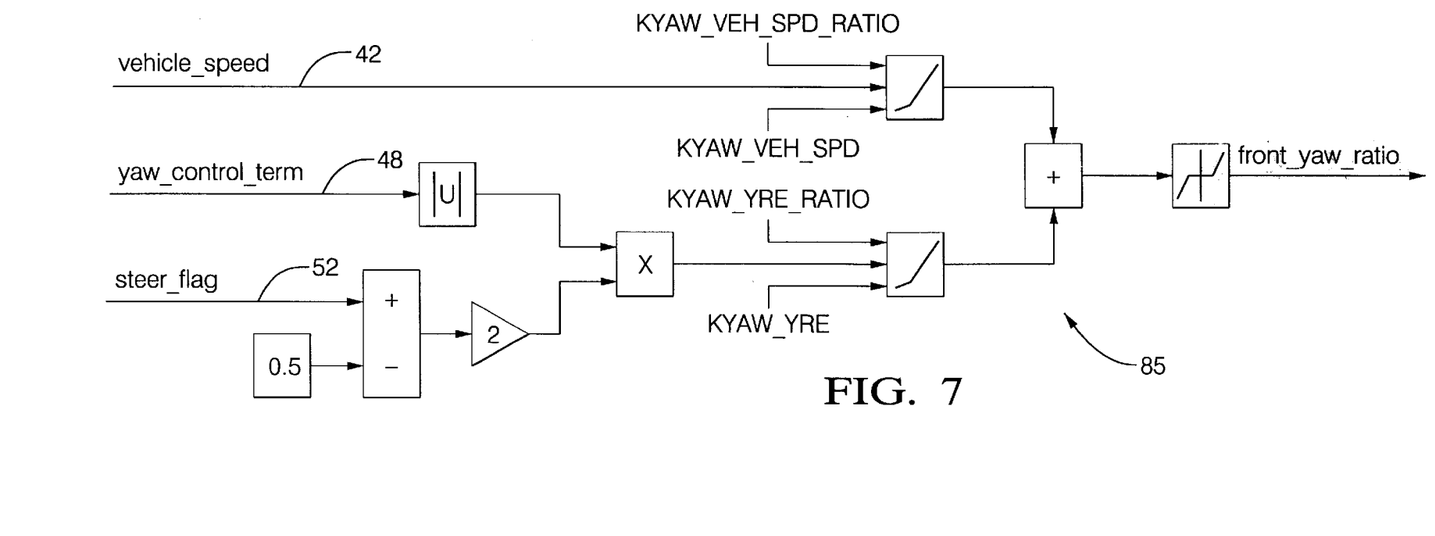
FIG. 7 is a block diagram of the control ratio calculation block.

Referring to FIG. 7 there is shown the block diagram associated with the Control Ratio Calculation 85 function. The Control Ratio Calculation 85 function determines the ratio between the total damping and the damping that is done at the front axle. The front damping ratio is determined by the under/oversteer of the vehicle and the speed of the vehicle. If the vehicle is oversteering then the front ratio will be greater than 0.5, or a larger percent of the vehicle damping will be on the front axle as opposed to the rear axle. If the vehicle is understeering, the front ratio will be less than 0.5, or a larger percent of the vehicle damping will be on the rear axle opposed to the front axle. The front damping ratio also changes as a function of vehicle speed. The speed dependent term or feedforward term 210 increases damping to the front axle as the vehicle speed increases. The front ratio 205 is then saturated between KYAW_MAX_RATIO 175 and KYAW_MIN_RATIO 180. The following pseudo code shows how the front damping rate is calculated:

control_term =ABS(yaw_rate_control term))*2*(steer_flag−0.5)

fb_term=table1(KYAW_YRE,KYAW_YRE_RATIO, control_term)

ff_term=table1(KYAW_VEH_SPD,KYA W_VEH_SPD_RATIO, vehicle_speed)

front_yaw_ratio=0.5+fb_term+ff_term

IF (front_yaw_ratio>KYAW_MAX_RATIO) front_yaw_ratio=KYAW_MAX_RATIO

ELSE IF(front_yaw_ratio<KYAW_MIN_RATIO) front_yaw_ratio=KYAW_MIN_RATIO;

END IF

Typical values are:

| | | |
|---|---|---|
| KYAW_YRE 185 | [0, 7, 12] | (deg/sec) |
| KYAW_YRB_RATIO 190 | [0, 0.1, 0.5] | (Ratio) |
| KYAW_VEH_SPD 195 | [0, 70, 135] | (mph) |
| KYAW_SPD_RATIO 200 | [0, 0.0, 0.4] | (Ratio) |
| KYAW_MAX_RATIO 175 | 0.85 | (Ratio) |
| KYAW_MIN_RATIO 180 | 0.25 | (Ratio) |

As detailed above, the front damping ratio increases as the vehicle speed increases. The front damping increases in magnitude with increases in the yaw control term 48 during oversteering, and decreases with increases in the yaw control term 48 during understeering conditions.

Figure 8:
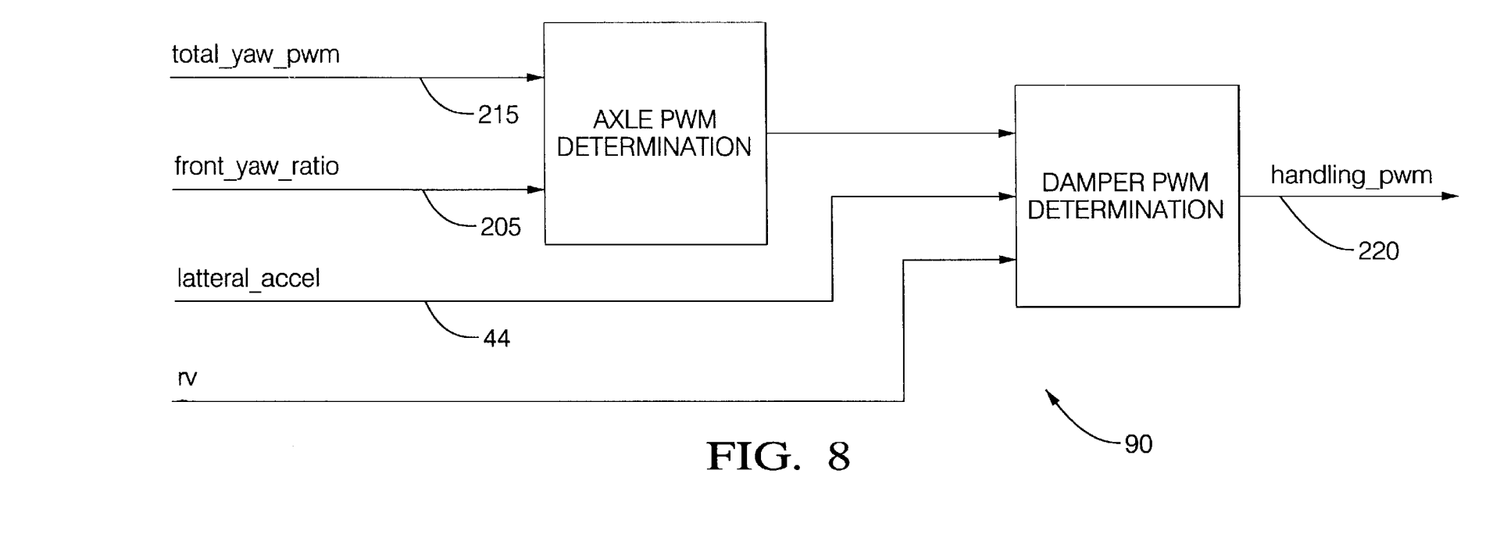
FIG. 8 is a block diagram of the corner control calculation block.

Referring to FIG. 8, there is shown the block diagram associated with the Corner Control Calculation 90 function. The Corner Control Calculation 90 function determines the PWM, or handling damping value, for each damper, left front (LF), right front (RF), left rear (LR) and right rear (RR). Two possibly contradictory calculations were conducted, in the sections outlined above, the Total PWM calculation 80 and the Control Ratio Calculation 85. The Corner Control Calculation 90 function attempts to resolve the two calculations into four damper PWM commands. An example of the contradiction is when the total PWM calculation yields 400% PWM with a front ratio of one. The total PWM calculation 80 wants 100% PWM command at each damper while the front ratio calculation 85 wants all damping at the front axle and no damping at the rear axle which results in a total damping of 200% PWM for the vehicle. The corner control calculation 90 maintains the front axle ratio 205 generated by the control ratio calculation 85 function and sacrifices the total PWM calculation 80 if required. The amount of damping at each corner is also a function of the rebound and compression at the given corner. The following pseudo code shows how the corner control is calculated:

/*Axle PWMDetermination*/

IF (front_yaw_ratio>=0.5) /*oversteer*/
  handling_pwm[LF]=front_yaw_ratio*total_yaw_pwm/2;
  /*calculate LF handling PWM*/
  IF (handling_pwm[LF]>100) /*saturate LF handling PWM to 100%*/
    handling_pwm[LF]=100
  END IF
  handling_pwm[RF]=handling_pwm[LF]; /*equate RF to LF*/
    /*the ratio between the front and rear axle remains the same*/
  handling_pwm[LR]=handling_pwm[LF]*(1-front_yaw_ratio)/front_yaw_ratio
  handling_pwm[RR]=handling_pwm[LR]
ELSE /*understeer*/
  handling_pwm[LR]=(1-front_yaw_ratio)*total_yaw_pwm/2
  /*calculate LR handling PWM*/
  IF (handling_pwm[LR]>100) /*saturate LR handling PWM*/
    handling_pwm[LR]=100
  END IF
  handling_pwm[RR]=handling_pwm[LR]/*equate RR to LR
    handling PWM*/
  handling_pwm[LF]=handling_pwm[LR]*front_yaw ratio/(1-front_yaw_ratio) /*the ratio between the front and rear axle remains the same*/

```
        handling_pwm[RF]=handling_pwm[LF]
    END IF
/*Damper PWMDetermination*/
    IF(lateral_accel>=0) /*right turn*/
        IF(rv[LF]>0) /*left front wheel rebound*/
            handling_pwm[LF]=handling_pwm[LF]*
                KYAW_DIRECTION_FACTOR
        END IF
        IF (rv[RF]<0) /*right front wheel compress*/
            handling_pwm[RF]=handling_pwm[RF]*
                KYAW_DIRECTION_FACTOR
        END IF
        IF (rv[LR]>0) /*left rear wheel rebound*/
            handling_pwm[LR]=handling_pwm[LR]*
                KYAW_DIRECTION_FACTOR
        END IF
        IF (rv[RR]<0) /*right rear wheel compress*/
            handling_pwm[RR]=handling_pwm[RR]*
                KYAW_DIRECTION_FACTOR
        END IF
    ELSE /*left turn*/
        IF(rv[LF]<0) /*left front wheel compress*/
            handling_pwm[LF]=handling pwm[LF]*
                KYAW_DIRECTION_FACTOR
        END IF
        IF (rv[RF]>0) /*rightfront wheel rebound*/
            handling_pwm[RF]=handling_pwm[RF]*
                KYAW_DIRECTION_FACTOR
        END IF
        IF (rv[LR]21 0) /*left rear wheel compress*/
            handling_pwm[LR]=handling pwm[LR]*
                KYAW_DIRECTION_FACTOR
        END IF
        IF (rv[RR]>0) /*right rear wheel rebound*/
            handling_pwm[RR]=handling_pwm[RR]*
                KYAW_DIRECTION_FACTOR
        END IF
    END IF
```

The pseudo code first determines if the vehicle is oversteering or understeering by looking at the front_yaw_ratio 205. If the front_yaw_ratio 205 is greater then 0.5 the vehicle is oversteering and if below the vehicle is understeering. If the vehicle is oversteering the left front handling PWM is calculated by multiplying half the total yaw_pwm 215 by the front_yaw_ratio 205. The left front handling PWM is then saturated and the right front handling PWM is set equal to the left front handling PWM. The ratio between the front and the rear axle is maintained by multiplying the left front handling PWM by (1-front_yaw_ratio)/front_yaw_ratio, or:

$$\frac{\text{handling\_pwm}[LF]}{\text{handling\_pwm}[LR]} = \frac{\text{front\_yaw\_ratio}}{(1 - \text{front\_yaw\_ratio})}$$

$$\text{handling\_pwm}[LR] = \frac{(1 - \text{front\_yaw\_ratio})}{\text{front\_yaw\_ratio}} \text{handling\_pwm}[LF]$$

The right rear handling PWM is set equal to the left rear handling PWM. If the vehicle is understeering the rear axle handling PWMs are calculated and saturated, then the front axle handling PWMs are calculated.

The directional corner control 90 determines the direction the vehicle is turning and multiplies the handling_pwm 220 by the KYAW_DIRECTION_FACTOR when the vehicle's relative velocities (RVs) are not in the desired direction. The desired direction is determined by the RVs imposed by the inertia forces on the vehicle, or:

| Direction of turn/corner | LF | RF | LR | RR |
|---|---|---|---|---|
| Right turn | C | R | C | R |
| Left turn | R | C | R | C |

In the above table, C refers to compression and R to rebound of suspension. A typical value for KYAW_DIRECTION_FACTOR is 0.85. If RV sensors are not available, directional corner control is not performed, meaning the damping levels are the same in both rebound and compression which, is equivalent to setting the KYAW_DIRECTION_FACTOR to 1.

Figure 9:
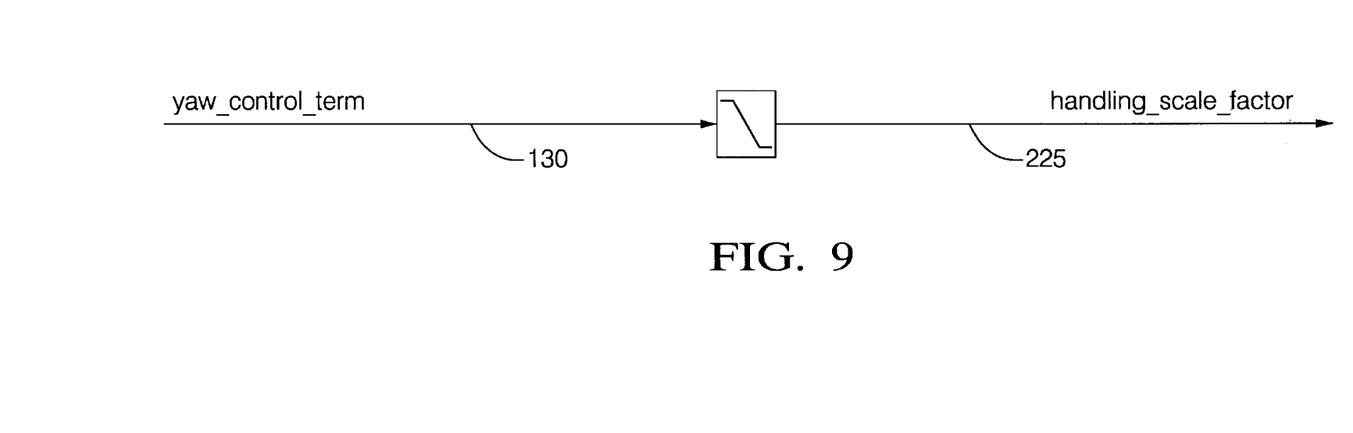
FIG. 9 is a block diagram of the handling factor calculation block.

Referring to FIG. 9, there is shown the block diagram associated with the Handling Factor Calculation 95 finction. The Handling Factor Calculation 95 function determines a factor, handling_scale_factor 225 that varies from 0 to 1. The factor is multiplied by each value of the body demand force in the CVRTD algorithm 45 disclosed in U.S. Pat. No. 5,570,288, issued Oct. 29, 1996, which is hereby incorporated by reference. In the referenced U.S. Pat. No. 5,570,288, the handling scale factor would be multiplied times the body demand force value for each wheel in block 142 of the referenced U.S. Pat. No. 5,570,288 so that the body demand force values output on bus 164 of the referenced U.S. Pat. No. 5,570,288 are scaled in response to yaw rate error. The factor removes body demand force when large yaw rate errors are present and thus shifts the suspension control away from vehicle body control toward the vehicle handling control of this invention. This allows the Closed Loop MR Yaw Control Algorithm 50 to have more control of the damper commands when an event with large yaw rate error is detected. The handling_scale_factor 225 is calculated using a 2 point one dimensional lookup table with yaw_rate_control_term_limit 130 as the input. For small yaw rate errors the handling_scale_factor 225 is one. As the yaw rate error (KYAW_YRE_HANDLING[1]) becomes larger, the handling_scale_factor 225 (KYAW_YRE_HANDLING_FACTOR[1]) value becomes smaller. Typical values are:

| KYAW_YRE_HANDLING | [7.5 12.0] | (deg/sec) |
|---|---|---|
| KYAW_YRB_HANDLING_FACTOR | [1.0 0.0] | |

The final PWM, or corner damping command, associated with the CVRTD algorithm is the maximum between the Damper Based Yaw Control's handling_pwm[LF–RR] and the CVRTD algorithm's pwm_filt[LF–RR] or, pwm_cnr=MAX(handling_pwm, pwm_filt).

The pwm_filt variable, a damping value derived from suspension component movement calculated in the CVRTD algorithm 45, is a combination of body and wheel demand forces for each damper, and pwm_cnr is the final PWM command that is sent to each damper. In the referenced U.S. Pat. No. 5,570,288, the pwm_filt variable refers either to the slew rate filtered PWM outputs on bus 218, the output of Automatic Mode PWM Slew Rate Limitation block 208 of that patent, or the filtered PWM outputs on lines 84, 86, 88, 90, the outputs of Automatic Mode PWM Duty Cycle Floor block 220; and the maximum function described above would be performed on those values with the result provided to the following block of the referenced U.S. Pat. No.

5,570,288. Either location is acceptable, since block 220 of the referenced patent, dealing with minimum values of the duty cycles, is not going to affect the maximum value comparison. It was noted in the above section that the body demand force was reduced for large yaw control terms, but the wheel demand force is not reduced. By not reducing the wheel demand force, wheel control is ensured on rough roads. For example, if the vehicle is in an oversteering condition and on a rough road the handling_pwm for the rear axle would be small, but the wheel demand force would be large which is reflected in the final damper PWM command, pwm_cnr.

While preferred embodiments are disclosed, a worker in this art would understand that various modifications would come within the scope of the invention and are considered to be within the scope of the following claims.

What is claimed is:

1. A method for using controllable dampers to improve vehicle response and stability during severe handling maneuvers, the vehicle including at least one controllable damper, a front axle and a rear axle, the method comprising:
    a) responsive to vehicle dynamic variables, deriving a total handling damping value for the vehicle;
    b) responsive to vehicle dynamic variables, deriving a control ratio of front axle roll damping to total roll damping for the vehicle;
    c) responsive to the total handling damping value and the ratio of front axle roll damping to total roll damping, deriving a handling damping value for the controllable damper; and
    d) blending the total handling damping value with a damping value derived from suspension component movement to determine a corner damping command for the controllable damper.

2. The method of claim 1 wherein the total handling damping value is derived responsive to one of a yaw rate error between a desired yaw rate and a measured yaw rate of the vehicle, a lateral acceleration of the vehicle, and a time derivative of desired lateral acceleration of the vehicle.

3. The method of claim 2 wherein the total handling damping value is derived from the greatest of the yaw rate error between a desired yaw rate and a measured yaw rate of the vehicle, the lateral acceleration of the vehicle, and the time derivative of desired lateral acceleration of the vehicle.

4. The method of claim 1 wherein the control ratio is derived from a yaw rate error between a desired yaw rate and a measured yaw rate of the vehicle.

5. The method of claim 4 wherein the control ratio increases during an oversteering condition and decreases during an understeering condition.

6. The method of claim 4 wherein the control ratio is further derived from vehicle speed.

7. The method of claim 6 wherein the control ratio increases as the vehicle speed increases.

8. The method of claim 1 wherein the damping value derived from suspension component movement is derived from a body damping value favoring damping control of the vehicle body and a wheel damping value favoring damping control of the wheel and the body damping value is reduced in response to a large magnitude of a yaw rate error between a desired yaw rate and a measured yaw rate of the vehicle.

9. A method for using controllable dampers to improve vehicle responses and stability during severe handling maneuvers, the vehicle including at least one controllable damper, a front axle, a rear axle, the method comprising:
    a) measuring wheel speeds;
    b) estimating vehicle speed
    c) measuring lateral acceleration;
    d) measuring yaw rate;
    e) measuring steering angle;
    f) estimating slip angle and slip rate;
    g) determining a desired yaw rate, a desired lateral acceleration, a desired slip angle, and a desired slip rate based upon a vehicle reference model;
    h) determining an error term derived from the difference between the desired yaw rate, desired slip angle, and the desired slip rate and the measured yaw rate and estimated slip angle and slip rate;
    i) determining if the vehicle is in an under steer or over steer condition and generating a steering signal flag;
    j) determining a derivative of the desired lateral acceleration by multiplying the desired yaw rate by the vehicle speed then differentiating the product;
    k) determining a handling pulse width modulation for each of the at least one controllable damper;
    l) determining a handling scale factor;
    m) blending the handling pulse-width modulation with a pulse width modulation derived from suspension component movement and having a wheel control component and a body control component multiplied by the handling scale factor to determine a total pulse width modulation for each of the controllable dampers.

10. A method for improving vehicle responses and stability during severe maneuvers, the vehicle including a front axle with a pair of wheels having associated controllable dampers, a rear axle with a pair of wheels having associated controllable dampers, the method comprising:
    a) responsive to at least one of a yaw rate error between a desired yaw rate and a measured yaw rate of the vehicle, a lateral acceleration of the vehicle, and a time derivative of lateral acceleration of the vehicle, deriving a total handling damping value for the vehicle;
    b) responsive to the yaw rate error between a desired yaw rate and a measured yaw rate of the vehicle, deriving a control ratio of axle roll damping on one of the front axle and the rear axle to total roll damping for the vehicle;
    c) responsive to the total handling damping value and the control ratio, deriving a handling damping value for the controllable dampers associated with the wheels of one of the front axle and the rear axle; and
    d) controlling the controllable dampers associated with the wheels of one of the front axle and the rear axle in response to their derived handling damping values.

11. The method of claim 10 wherein the control ratio is adjusted by a value having a magnitude derived from the yaw rate error between a desired yaw rate and a measured yaw rate of the vehicle and a sign derived from a determined oversteer/understeer condition of the vehicle.

12. A method for using controllable dampers to improve vehicle response and stability during severe handling maneuvers, the vehicle including at least one controllable damper, a front axle and a rear axle, the method comprising:
    a) responsive to vehicle dynamic variables, deriving a total handling damping value for the vehicle;
    b) responsive to vehicle dynamic variables, deriving a control ratio of front axle roll damping to total roll damping for the vehicle;
    c) responsive to the total handling damping value and the ratio of front axle roll damping to total roll damping, deriving a handling damping value for the controllable damper; and d) deriving a corner damping command for the controllable damper at least in part from the total handling damping value.

13. The method of claim 12 wherein the total handling damping value is derived responsive to one of a yaw rate error between a desired yaw rate and a measured yaw rate of the vehicle, a lateral acceleration of the vehicle, and a time derivative of lateral acceleration of the vehicle.

14. The method of claim 13 wherein the total handling damping value is derived from the greatest of the yaw rate error between a desired yaw rate and a measured yaw rate of the vehicle, the lateral acceleration of the vehicle, and the time derivative of lateral acceleration of the vehicle.

15. The method of claim 12 wherein the control ratio is derived from a yaw rate error between a desired yaw rate and a measured yaw rate of the vehicle.

16. The method of claim 15 wherein the control ratio increases during an oversteering condition and decreases during an understeering condition.

17. The method of claim 15 wherein the control ratio is further derived from vehicle speed.

18. The method of claim 17 wherein the control ratio increases as the vehicle speed increases.

* * * * *

UNITED STATES PATENT AND TRADEMARK OFFICE
CERTIFICATE OF CORRECTION

PATENT NO.   : 6,505,108 B2
DATED        : January 7, 2003
INVENTOR(S)  : Mark Olen Bodie et al.

It is certified that error appears in the above-identified patent and that said Letters Patent is hereby corrected as shown below:

Title page,
Ietm [75], Inventors, add the following inventors
-- Hsien Heng Chen, Troy MI (US)
   Sinisa Mandich, Munich, Germany --

Signed and Sealed this

Twenty-second Day of February, 2005

JON W. DUDAS
*Director of the United States Patent and Trademark Office*